United States Patent
Tan et al.

(10) Patent No.: US 8,285,475 B2
(45) Date of Patent: Oct. 9, 2012

(54) COMBINED BEACON AND SCENE NAVIGATION SYSTEM

(75) Inventors: Meng Whui Tan, Penang (MY); Kenneth Jin Kiong Ang, Penang (MY); Beng Chye Lye, Penang (MY); Edward Kah Ching Teoh, Selangor (MY); Willie Song, Penang (MY)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 1574 days.

(21) Appl. No.: 11/681,637

(22) Filed: Mar. 2, 2007

(65) Prior Publication Data

US 2008/0212870 A1 Sep. 4, 2008

(51) Int. Cl.
*G06K 9/62* (2006.01)
*G01C 21/00* (2006.01)

(52) U.S. Cl. ........ 701/300; 701/517; 701/408; 701/519; 701/532; 701/445; 367/118; 382/100; 382/103; 382/195; 382/201; 382/154; 382/254

(58) Field of Classification Search ........... 707/E17.018; 701/208, 28, 300, 517, 408, 519, 200; 318/587; 382/100, 103, 195, 201; 367/118
See application file for complete search history.

(56) References Cited

U.S. PATENT DOCUMENTS

| | | | | |
|---|---|---|---|---|
| 5,961,571 A * | 10/1999 | Gorr et al. | | 701/207 |
| 5,974,348 A * | 10/1999 | Rocks | | 701/28 |
| 6,453,223 B1 * | 9/2002 | Kelly et al. | | 701/28 |
| 6,587,784 B1 * | 7/2003 | Okude et al. | | 701/208 |
| 6,766,245 B2 * | 7/2004 | Padmanabhan | | 701/207 |
| 6,898,518 B2 * | 5/2005 | Padmanabhan | | 701/207 |
| 6,922,632 B2 * | 7/2005 | Foxlin | | 701/517 |
| 7,456,847 B2 * | 11/2008 | Krajec | | 345/629 |
| 7,835,544 B2 * | 11/2010 | Machida | | 382/107 |
| 2001/0056326 A1 * | 12/2001 | Kimura | | 701/208 |
| 2002/0010694 A1 * | 1/2002 | Navab et al. | | 707/1 |
| 2004/0202363 A1 | 10/2004 | Cowperthwaite et al. | | |
| 2005/0060088 A1 * | 3/2005 | Helal et al. | | 701/208 |
| 2008/0109158 A1 * | 5/2008 | Huhtala et al. | | 701/208 |
| 2008/0212870 A1 * | 9/2008 | Tan et al. | | 382/154 |
| 2008/0262718 A1 * | 10/2008 | Farwell | | 701/207 |
| 2009/0125234 A1 * | 5/2009 | Geelen et al. | | 701/209 |
| 2010/0145610 A1 * | 6/2010 | Bacabara et al. | | 701/208 |
| 2010/0207845 A1 * | 8/2010 | Pal et al. | | 345/7 |
| 2012/0085820 A1 * | 4/2012 | Morgan | | 235/375 |

FOREIGN PATENT DOCUMENTS

| | | | |
|---|---|---|---|
| EP | 2161544 A1 * | 3/2010 | |
| GB | 2484316 A * | 4/2012 | |
| JP | 2000-108874 A * | 4/2000 | |
| JP | 2003337043 A * | 11/2003 | |
| JP | 2008055155 A * | 3/2008 | |

(Continued)

OTHER PUBLICATIONS

Acharya, R. et al., Broadcast Disks : Data Management for Asymmetric Communications Environments, ACM SIGMOD, Jun. 1995.*

(Continued)

*Primary Examiner* — Cuong H Nguyen

(57) ABSTRACT

A controller and navigation system to implement beacon-based navigation and scene-based navigation is described. The navigation system may generate position data for the controller to compensate for a misalignment of the controller relative to the coordinate system of the navigation system. The navigation system may also distinguish between a beacon light source and a non-beacon light source.

17 Claims, 9 Drawing Sheets

FOREIGN PATENT DOCUMENTS

| | | | | |
|---|---|---|---|---|
| JP | 2008268204 | A | * | 11/2008 |
| JP | 2009020860 | A | * | 1/2009 |
| TW | 569156 | | | 1/2004 |
| TW | 200422984 | | | 11/2004 |
| TW | 201037274 | A | * | 10/2010 |

OTHER PUBLICATIONS

Teller, et al., MIT City Scanning Project: Fully Automated Model Acquisition in Urban Areas, MIT City Scanning Project, Jan. 2002.*

Bahl P. et al., RADAR: An In-Building RF-Based User Location and Tracking System, IEEE INFOCOM 2000, Mar. 2000.*

Padmanabhan, LandLoc: Landmark-Based Location of Users, Technical Report MSR-TR-2001-23, Jan. 2001.*

Automobile navigation system using individual communication beacon; Kanemitsu, H.; Saito, T.; Shima, J.; Tanaka, Y.; Vehicle Navigation and Information Systems Conference, 1991; vol. 2; Digital Object Identifier: 10.1109/VNIS.1991.205769; Publication Year: 1991, pp. 241-245.*

Sensor fusion of structure-from-motion, bathymetric 3D, and beacon-based navigation modalities; Singh, H.; Salgian, G.; Eustice, R.; Mandelbaum, R.; Robotics and Automation, 2002. Proceedings. ICRA '02. IEEE International Conference on vol. 4; Digital Object Identifier: 10.1109/ROBOT.2002.1014366; Publication Year: 2002, pp. 4024-4403.*

Recovering Occlusion Boundaries from a Single Image; Hoiem, D.; Stein, A.N.; Efros, A.A.; Hebert, M.; Computer Vision, 2007. ICCV 2007. IEEE 11th International Conference on; Digital Object Identifier: 10.1109/ICCV.2007.4408985; Publication Year: 2007, pp. 1-8.*

A simplified vibrotactile navigation system for sightseeing; Tamiya, Yuji; Nojima, Takuya; VR Innovation (ISVRI), 2011 IEEE International Symposium on ; Digital Object Identifier: 10.1109/ISVRI.2011.5759597; Publication Year: 2011, pp. 33-36.*

Omni-directional Vision Localization Based on Particle Filter; Zuoliang Cao; Shiyu Liu; Roning, J.; Image and Graphics, 2007. ICIG 2007. Fourth International Conference on; Digital Object Identifier: 10.1109/ICIG.2007.145; Publication Year: 2007, pp. 478-483.*

A correlation-based autofocus algorithm for coherent circular synthetic aperture sonar; Marston, Timothy Synthetic Aperture Radar, 2012. EUSAR. 9th European Conference on; Publication Year: 2012, pp. 66-69.*

A Nonlinear Attitude Observer Based on Active Vision and Inertial Measurements; Bras, S.; Cunha, R.; Vasconcelos, J.F.; Silvestre, C.; Oliveira, P.; Robotics, IEEE Transactions on; vol. 27, Issue: 4; Digital Object Identifier: 10.1109/TRO.2011.2112950 Publication Year: 2011, pp. 664-677.*

A new approach to vision-aided inertial navigation; Tardif, J.-P.; George, M.; Laverne, M.; Kelly, A.; Stentz, A.; Intelligent Robots and Systems (IROS), 2010 IEEE/RSJ International Conference on; Digital Object Identifier: 10.1109/IROS.2010.5651059 Publication Year: 2010, pp. 4161-4168.*

TW Search Report, Sep. 20, 2011.

* cited by examiner

COMBINED BEACON AND SCENE NAVIGATION SYSTEM

BACKGROUND OF THE INVENTION

Currently, microelectromechanical systems (MEMS) gyroscopes, or gyros, are widely used for free space navigation. The gyro reports position information based on the change in capacitance. To create a three-dimensional (3D) gaming controller 12, as shown in the navigation system 10 of FIG. 1, a complimentary metal-oxide-semiconductor (CMOS) image sensor is used together with the gyro. Both the image sensor and the gyro are located within the controller 12. The image sensor navigates with respect to a beacon 14, which includes two light source clusters 16. Based on the relative position of the image sensor to the beacon 14, the controller 12 outputs x, y, and z positions along an x axis 18, a y axis 20, and a z axis 22. When the beacon 14 is outside the field of view (FOV) of the image sensor, the gyro takes over and reports the gross motion of the controller 12.

However, there are several disadvantages associated with conventional gyro navigation systems. For example, micromachine fabrication facilities are very costly. Thus, there is a high initial development and setup cost related to fabricating gyros. Also, a gyro is only able to report position changes in one dimension. Therefore, a device that reports multiple dimensions would implement a corresponding number of gyros. For example, two gyros would be used to report position in two dimensions (2D). Additionally, current gyro-based controllers are not able to report positional changes along the z-axis extending toward and away from, for example, a gaming display.

There are also some difficulties associated with beacon-based navigation systems. In general, once the beacon 14 is out of the field of view, or out of range, of the image sensor, the image sensor no longer contributes to the navigation of the controller 12. It is for this reason that the gyro is relied on to report gross motion of the controller 12. Additionally, beacon-based navigation systems are also very sensitive to environmental noise such as other light sources 24 within the field of view of the image sensor. In other words, the non-beacon light sources can result in a false reading during the data processing of the beacon image. FIG. 1 illustrates multiple non-beacon light sources 24 (i.e., environmental noise) surrounding the beacon 14 and within the field of view of the image sensor in the controller 12. It can be difficult for the image sensor to differentiate between the beacon light sources 16 and the non-beacon light sources 24. Also, if a weighted algorithm is used, there can be a lag when one of the beacon light sources 16 moves in and out of the field of view of the image sensor.

FIGS. 2 and 3 illustrate another difficulty with conventional beacon navigation systems. In particular, FIGS. 2 and 3 illustrate how movement of the controller 12 can be interpreted on a display 30. It should be noted, generally, that conventional beacon navigation systems are designed for the controller 12 to be aligned with each of the x, y, and z axes 18, 20, and 20 of the navigation system's coordinate system. When the controller 12 is correctly aligned with the navigation system's coordinate system, the display 30 accurately represents the movement of the controller 12. For example, FIG. 2 illustrates an up-and-right movement of the controller 12 as an up-and-right movement on the display 30 when the controller 12 is accurately aligned. However, when the controller 12 is not perfectly aligned with respect to one or more axes 18, 20, and 22, the display 30 recreates a representation of the imperfect movement of the controller 12. For example, FIG. 3 illustrates the controller 12 slightly tilted at an angle, θ, with respect to the y axis 20. Thus, when the controller is at this slight angle, θ, and a user attempts to move the controller 12 in an up-and-right movement, the display 30 shows an accurate, although undesirable, movement tilted at the same angle, θ, even though the user intended to generate an up-and-right movement on the screen. This type of translation without accounting for a slight angular disparity, or tilt, results in restricted usage of beacon-based controllers 12.

SUMMARY OF THE INVENTION

A controller and navigation system to implement beacon-based navigation and scene-based navigation is described. Embodiments of the controller and navigation system also generate position data for the controller to compensate for a misalignment of the controller relative to the coordinate system of the navigation system. Embodiments of the controller and navigation system also distinguish between a beacon light source and a non-beacon light source.

Embodiments of an apparatus are also described. In one embodiment, the apparatus is a controller for navigation in a navigation system. The controller includes an image sensor and navigation processing logic. The image sensor is configured to generate an image within a field of view of the controller. The navigation processing logic is coupled to the image sensor and is configured to process the image to alternatively implement beacon-based navigation and scene-based navigation depending on the processed image. Other embodiments of the apparatus are also described.

Embodiments of a method are also described. In one embodiment, the method is a method for controlling a navigation system. The method includes generating a plurality of images within a field of view of an image sensor, determining whether at least one of the plurality of images includes a representation of a beacon, generating a first position data signal according to beacon-based navigation in association with an image which includes the representation of the beacon, and generating a second position data signal according to scene-based navigation in association with another image which excludes the representation of the beacon. Other embodiments of the method are also described.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1:
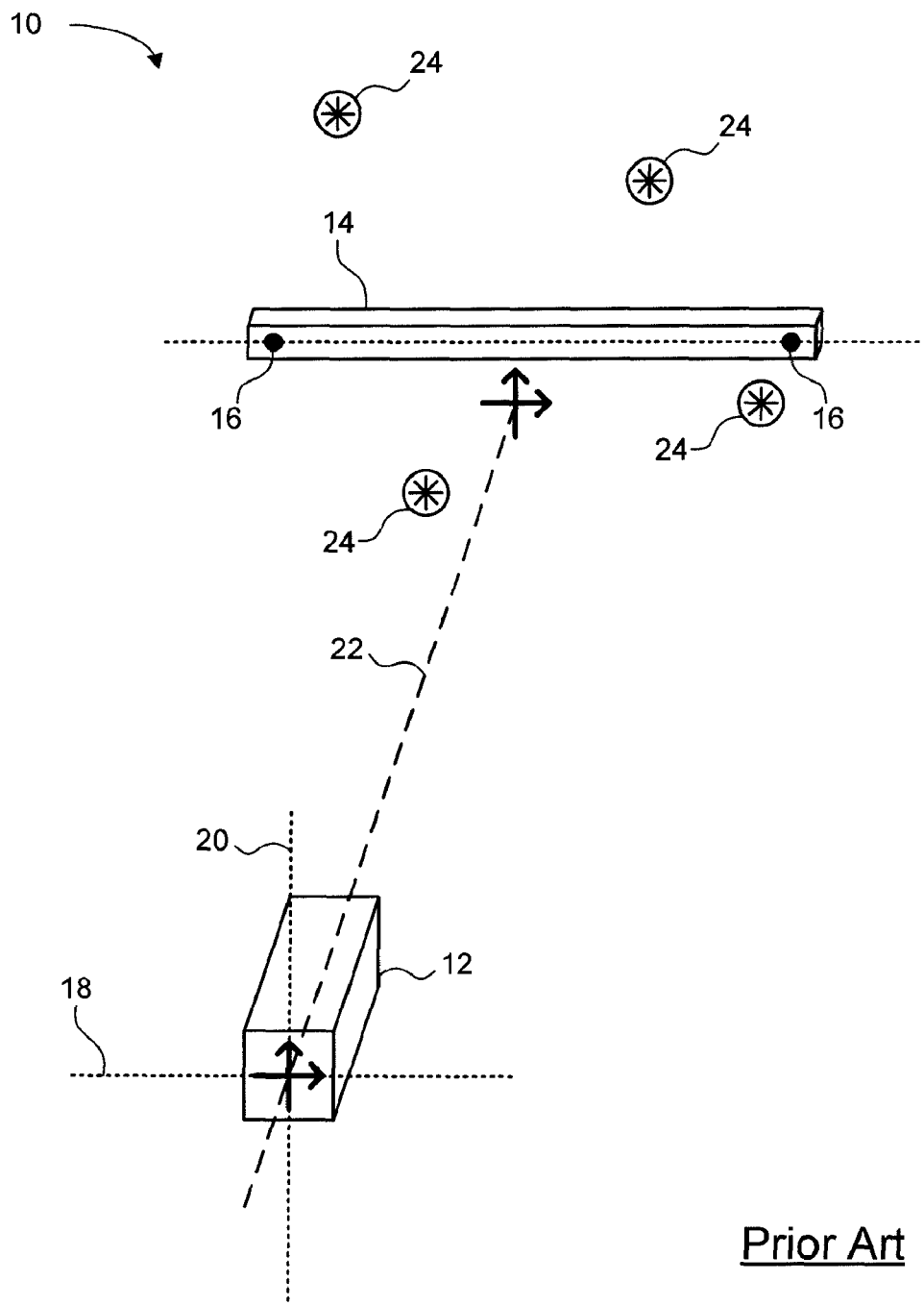
FIG. 1 depicts a schematic diagram of a conventional beacon navigation system, as well as beacon interference in the conventional beacon navigation system.
Figure 2:
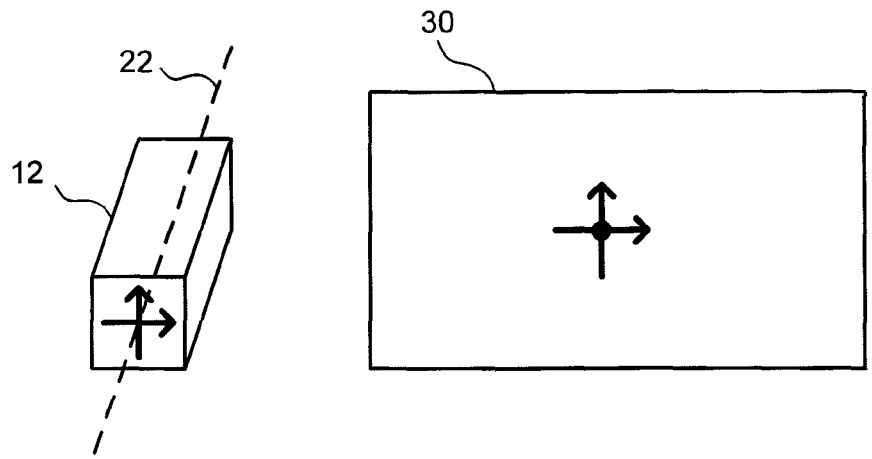
FIG. 2 depicts a schematic diagram of a translated movement on a display device corresponding to a movement of a controller when the controller is aligned with the axes of the beacon navigation system.
Figure 3:
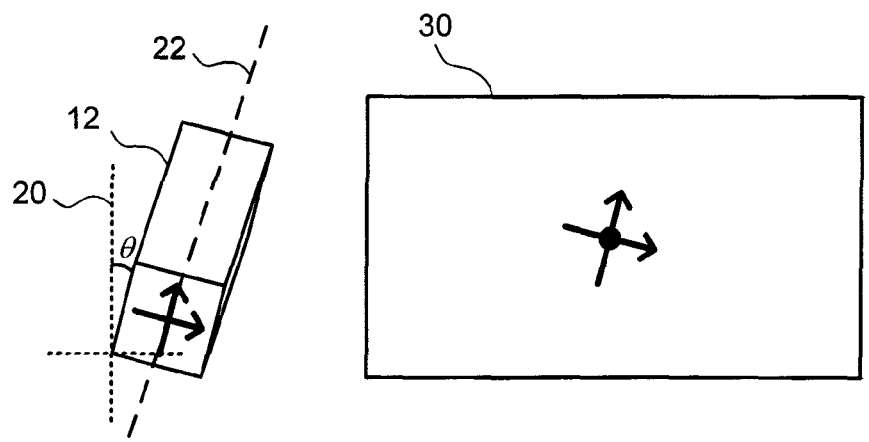
FIG. 3 depicts a schematic diagram of a translated movement on a display device corresponding to a movement of a controller when the controller is not aligned with the axes of the beacon navigation system.
Figure 4:
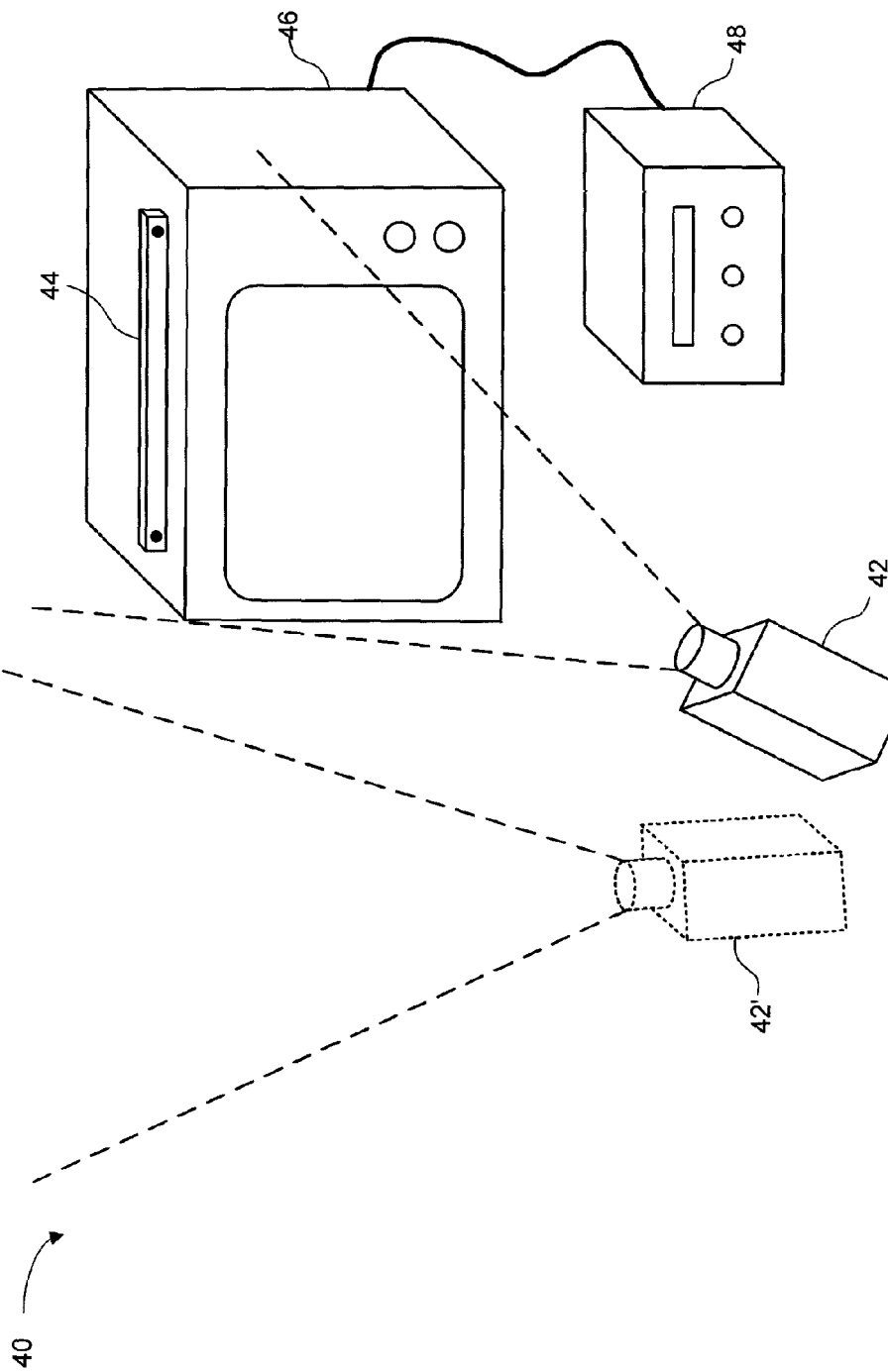
FIG. 4 depicts a schematic diagram of one embodiment of navigation system which employs beacon navigation and scene navigation.

FIG. 4 depicts a schematic diagram of one embodiment of navigation system 40 which employs beacon navigation and scene navigation. The depicted navigation system includes a controller 42, a beacon 44, a display device 46, and a console 48. In some embodiments, the console 48 is coupled to the display device 46 using conventional wiring. Alternatively, other wired or wireless connections may be implemented. In one embodiment, the controller 42 and the console 48 are part of a gaming system. Alternatively, the navigation system 40 may be used to implement other types of systems. For example, some embodiments of the navigation system 40 may be used to provide an accessible user interface for a computer system, and entertainment system, or another type of system.

When the controller 42 is oriented with the beacon 44 within its field of view (FOV), the controller 42 implements beacon navigation. Beacon navigation is based on the ability of the controller 42 to calculate position data which relates the position of the controller 42 to the beacon 44, or vice versa. An image sensor in the controller 42 creates images of the beacon 44, which includes multiple light sources or clusters of light sources, when the beacon 44 is within the field of view of the controller 42. In one embodiment, the beacon 44 includes a series of infrared (IR) light emitting diodes (LEDs) that are separated at predetermined distances. Additional embodiments of the beacon 44 are described below. Based on the relative position of the image sensor to the beacon 14, the controller 12 outputs x, y, and z positions along x, y, and z axes of the navigation system. In one embodiment, the coordinate system of the navigation system 40 is established during a calibration stage.

In contrast, when the controller 42 is oriented so that the beacon 44 is not in its field of view, the controller 42 implements scene navigation. Scene navigation is based on the ability of the controller 42 to compare relative locations of objects within time-indexed images to determine how the orientation and/or location of the controller 42 have changed over time. Additional details of scene navigation technology are available in U.S. Pat. No. 5,786,804, which is incorporated in its entirety herein. In this way, the controller 42 combines beacon navigation and scene navigation and switches between corresponding navigation modes depending on whether or not the controller 42 images the beacon 44 within its field of view.

While beacon navigation systems and scene navigation systems each have certain performance characteristics, the combined beacon and scene navigation system 40 facilitates a relatively accurate navigation technology. It should be noted that beacon navigation and scene navigation may be combined in sequence so that the controller 42 only implements either beacon navigation or scene navigation at a given time. Alternatively, in other embodiments, the controller 42 implements beacon navigation and scene navigation at the same time.

The accuracy of the combined beacon and scene navigation system 40 derives, at least in part, from the ability of the controller 42 to report three-dimensional (3D) position data (e.g., x, y, and z coordinates) in both the beacon navigation mode and the scene navigation mode. In the beacon navigation mode, the controller 42 reports x, y, and z position data based on the relative position of the controller 42 to the beacon 44. In the scene navigation mode, the controller 42 reports x, y, and z position data based on the relative position of a previous image, or part of the previous image, to a portion of a subsequent image. In other words, the scene navigation mode calculates the relative position data based on how the scene information changes between images.

It should be noted that all or part of the position data may be calculated at the controller 42. Any position data calculated at the controller 42 may be communicated to the console 48 for additional processing. In this way, the controller 42 and the console 48 together calculate and process the position data generated by the controller 42. As an example, the controller 42 may generate absolute position data which includes the absolute coordinates of the controller 42 within a coordinate system of the navigation system 40. As another example, the controller 42 may generate relative position data which includes a change in position, rather than absolute coordinates, of the controller 42. In one embodiment, the relative position data generated at the controller 42 is transmitted to the console 48, which calculates the absolute coordinates of the controller 42. Other embodiments may subdivide the position data processing operations between the controller 42 and the console 48 in another manner.

Compared to a conventional navigation system 10 that combines gyro navigation and beacon navigation, embodiments of the combined beacon and scene navigation system 40 have certain advantages. For example, some embodiments facilitate lower setup and development costs. Also, some embodiments of the combined beacon and scene navigation system 40 provide accurate three-dimensional positioning of the controller 42 even when the beacon is out of range of the controller 42. Additionally, some embodiments of the combined beacon and scene navigation system 40 may be implemented so that the navigation functionality of the controller 42 is integrated on a single silicon chip as an integrated circuit (IC). Thus, some embodiments mitigate the use of separate electronics and processing systems (e.g., beacon and gyro) within the controller 42.

Figure 5:
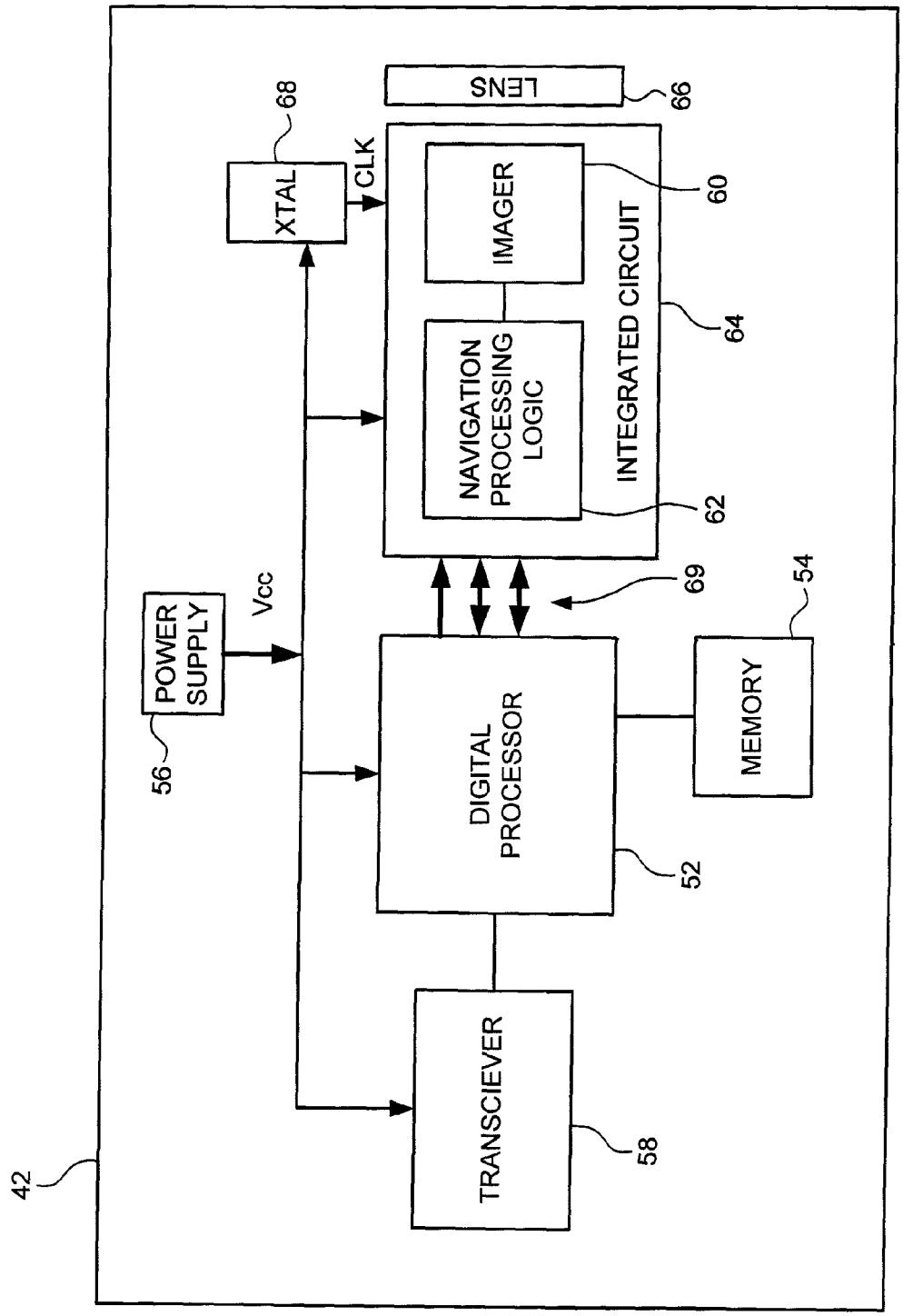
FIG. 5 depicts a schematic diagram of one embodiment of the controller of FIG. 4.

FIG. 5 depicts a schematic diagram of one embodiment of the controller 42 of FIG. 4. The illustrated controller 42 includes a digital processor 52, a memory device 54, a power supply 56, a transceiver 58, an image sensor 60, navigation processing logic 62 (combined with the image sensor 60 on an IC 64), an optical lens 66 and a crystal oscillator 68. Also, one or more address, data, or control signal lines 69 couple the IC 64 to the digital processor 62. Although the depicted controller 42 includes certain components, listed above, other embodiments of the controller 42 may include fewer or more components. For example, some embodiments of the controller 42 include input buttons, joysticks, or other selectors typically used for gaming controllers. Other embodiments of the controller 42 include feedback signal generators to generate a tactile or auditory feedback signal to a user.

In some embodiments, the digital processor 52 may be a general-purpose processor such as a microprocessor or microcontroller. In other embodiments, the digital processor 52 may be a special-purpose processor such as a digital signal processor. In other embodiments, the digital processor 52 may be another type of controller or a field programmable gate array (FPGA). In general, the digital processor 52 implements operations and functions of the controller 42.

The memory device 54 is configured to store data and/or instructions for use in the operation of the controller 42. In some embodiments, the memory device 54 stores instructions, which when executed by the digital processor 52, cause the digital processor 52 to perform certain operations. Similarly, some instructions may be stored in memory integrated into the digital processor 52. Additionally, the memory device 54 may store position data, as described above, produced by the digital processor 52.

In one embodiment, the power supply 56 provides direct current (DC) electrical signal, Vcc, to the digital processor 52, as well as other components of the controller 42. Some embodiments of the power supply 56 include one or more batteries. In some embodiments, the power supply 56 receives power from the console 48, via a wire. Other embodiments of the power supply 56 may be implemented. In a similar manner, the crystal oscillator 68 provides a clock signal, CLK, to one or more of the components of the controller 42.

The transceiver 58 is coupled to the digital processor 52 and includes a transmitter to transmit signals such as position data signals from the controller 42 to the console 48. Some embodiments of the transceiver 58 also include a receiver to receive control signals, or feedback signals, from the console 48. Additionally, the transceiver 58 may facilitate wired or wireless communications. For example, the transceiver 58 may send electrical signals via a hard-wired connection to the console 48. Alternatively, the transceiver 58 may send wireless signals, such as radio frequency (RF) signals, using known wireless data transmission protocols.

The image sensor 60 is also coupled to the digital processor 52. In one embodiment, the image sensor 60 captures images and transmits digital representations of the images to the digital processor 52. One type of image sensor 60 uses a complimentary metal-oxide-semiconductor (CMOS) image sensor array. For example, the image sensor 60 may include a 30×30 pixel array to generate an image with a relatively low resolution. However, other embodiments may use higher resolution image sensors with an increased pixel array size and corresponding gate count and power consumption. In the depicted embodiment, the image sensor 60 is used in conjunction with the optical lens 66. However, other embodiments may omit the lens 66, or implement multiple lenses 66.

In one embodiment, the navigation processing logic 62 is integrated on the IC 64 with the image sensor 60. In other embodiments, the navigation processing logic 62 may be partially or wholly integrated with the digital processor 52. In general, the navigation processing logic 62 facilitates implementation of the beacon navigation mode and the scene navigation mode by processing part or all of the images produced by the image sensor 60.

Figure 6:
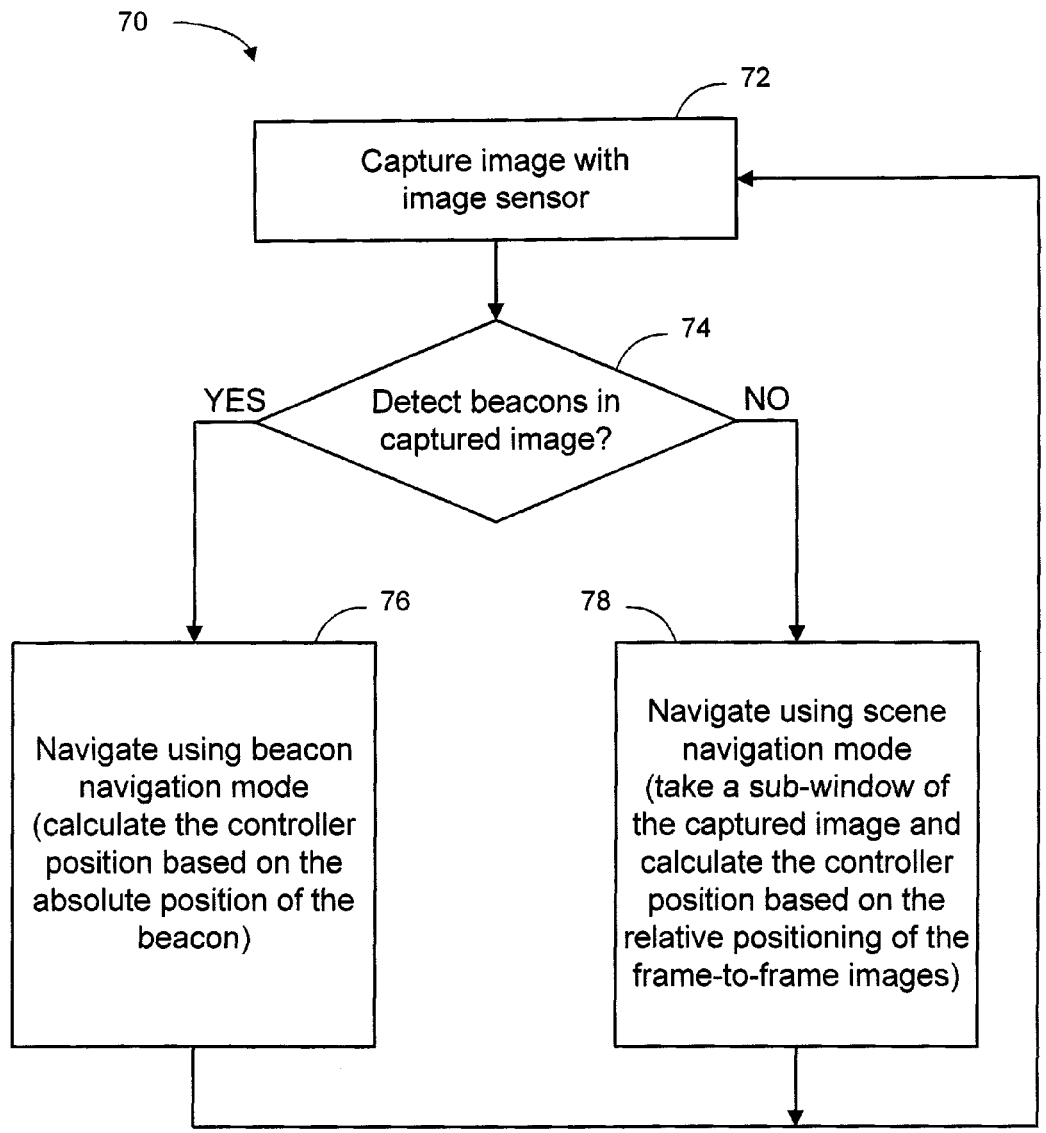
FIG. 6 depicts a schematic flow chart diagram of one embodiment of a method for implementing a navigation system with both beacon navigation and scene navigation.

FIG. 6 depicts a schematic flow chart diagram of one embodiment of a method 70 for operating a navigation system 40 with both beacon navigation and scene navigation. Although references are made to the navigation system 40 of FIG. 4, embodiments of the method 70 may be implemented in conjunction with other navigation systems.

At block 72, the image sensor 60 of the controller 42 captures an image. The image sensor 60 then transmits a digitized representation of the image to the digital processor 52. At block 74, the digital processor 52 uses one or more algorithms to determine if the image contains a representation of the beacon 44. If the digital processor 52 determines that the beacon 44 is present in the image, then at block 76 the controller 42 uses the beacon navigation mode to report position data to the console 48. In other words, the light sources on the beacon 44 are used as the feature, or reference, for navigation. For example, the controller 42 may calculate the controller position based on the absolute position of the beacon 44 relative to the controller 42. In one embodiment, the controller 42 communicates the x, y, and z positions of the controller 42 to the console 48 as inputs and the console 48 navigates accordingly. Alternatively, the controller 42 may report the x, y, and z positions of the beacon 44 to the console 48.

In the alternative, if the digital processor 52 determines that the beacon 44 is not present in the image, then at block 78 the controller 42 uses the scene navigation mode to report the position data to the console 48. In scene navigation, one or more features of an imaged scene are referenced, or extracted, from the scene and used for navigation. For example, the controller 42 may use a sub-window of one captured image to calculate the controller position based on relative positioning of the frame-to-frame images. In other words, by comparing at least portions of different images such as consecutive images, the controller 42 can calculate position data of the controller 42 at a time corresponding to the latter image, based on position data of the controller 42 at a time corresponding to the former image. This process continues during the operation of the controller 42.

It should be noted that while using a sub-window of the captured images may reduce the processing requirements of the controller 42, other embodiments may use the full image for more accurate positioning. One example of a situation in which a user might move the controller 42 so that the image sensor does not capture an image which includes the beacon 44 is when a user is swinging the controller for a baseball or golf swing during a game.

Figure 7:
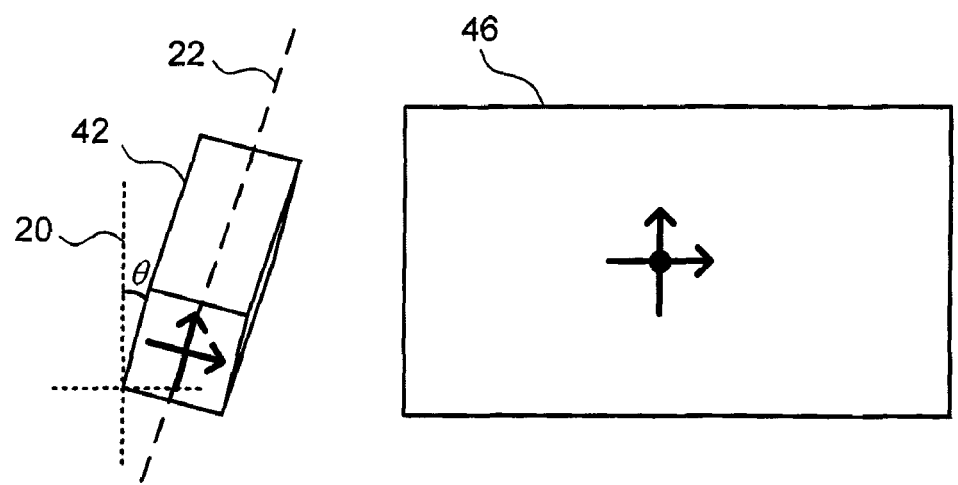
FIG. 7 depicts a schematic diagram of one embodiment of a compensated movement on a display device to represent a movement of a controller when the controller is not aligned with the axes of the beacon navigation system.

FIG. 7 depicts a schematic diagram of one embodiment of a compensated movement on a display device 46 to represent a movement of a controller 42 when the controller 42 is not aligned with the axes 18, 20, and 22 of the beacon navigation system 40. In other words, FIG. 7 illustrates how an up-and-right movement of the controller 42, while the controller 42 is misaligned with respect to at least one of the x, y, and z axes 18, 20, and 22 of the navigation system 40. In particular, the controller 42 is tilted at an angle, θ, relative to the y axis 20, but the display 46 represents the up-and-right movement of the controller 42 as an up-and-right movement on the display 46, without tilting the movement on the display.

In one embodiment, the controller 42 compensates for the misalignment of the controller 42 so that the movement represented on the display 46 does not include the misalignment. Alternatively, the console 48 may compensate for the misalignment, or the controller 42 and the console 48 together may compensate for the misalignment. Hence, the user can move the controller 42 freely while navigating within the X and Y plane, and the controller 42 and/or console 48 will be able to translate the perceived movement by the image sensor 60 into the actual movement by the controller 42.

In one embodiment, the following translation equations are implemented to compensate for the misalignment in one or more directions:

$$f(x) = X_{actual} \times X_{factor} + Y_{actual} \times Y_{factor} \times AR, \text{ and}$$

$$f(y) = Y_{actual} \times Y_{factor} + H \times H_{factor} - X_{actual} \times X_{factor} \times AR$$

In the first equation above, f(x) is the translated position value along the x axis 18, $X_{actual}$ is the actual position value along the x axis 18, $X_{factor}$ is a scaling factor value along the x axis 18, $Y_{actual}$ is the actual position value along the y axis 20, $Y_{factor}$ is a scaling factor value along the y axis 20, and AR is a scaling factor for the screen aspect ratio. Similarly, in the second equation above, f(y) is the translated position value along the y axis 20, $Y_{actual}$ is the actual position value along the y axis 20, $Y_{factor}$ is a scaling factor value along the y axis 20, H is the screen height, $H_{factor}$ is a scaling factor value along the screen height, $X_{actual}$ is the actual position value along the x axis 18, $X_{factor}$ is a scaling factor value along the x axis 18, and AR is a scaling factor for the screen aspect ratio. Similar algorithms may be implemented for tilting in different quadrants of the coordinate system of the navigation system 40. Also, it should be noted that some algorithms may compensate for misalignment at any value of the angle, θ.

Figure 8:
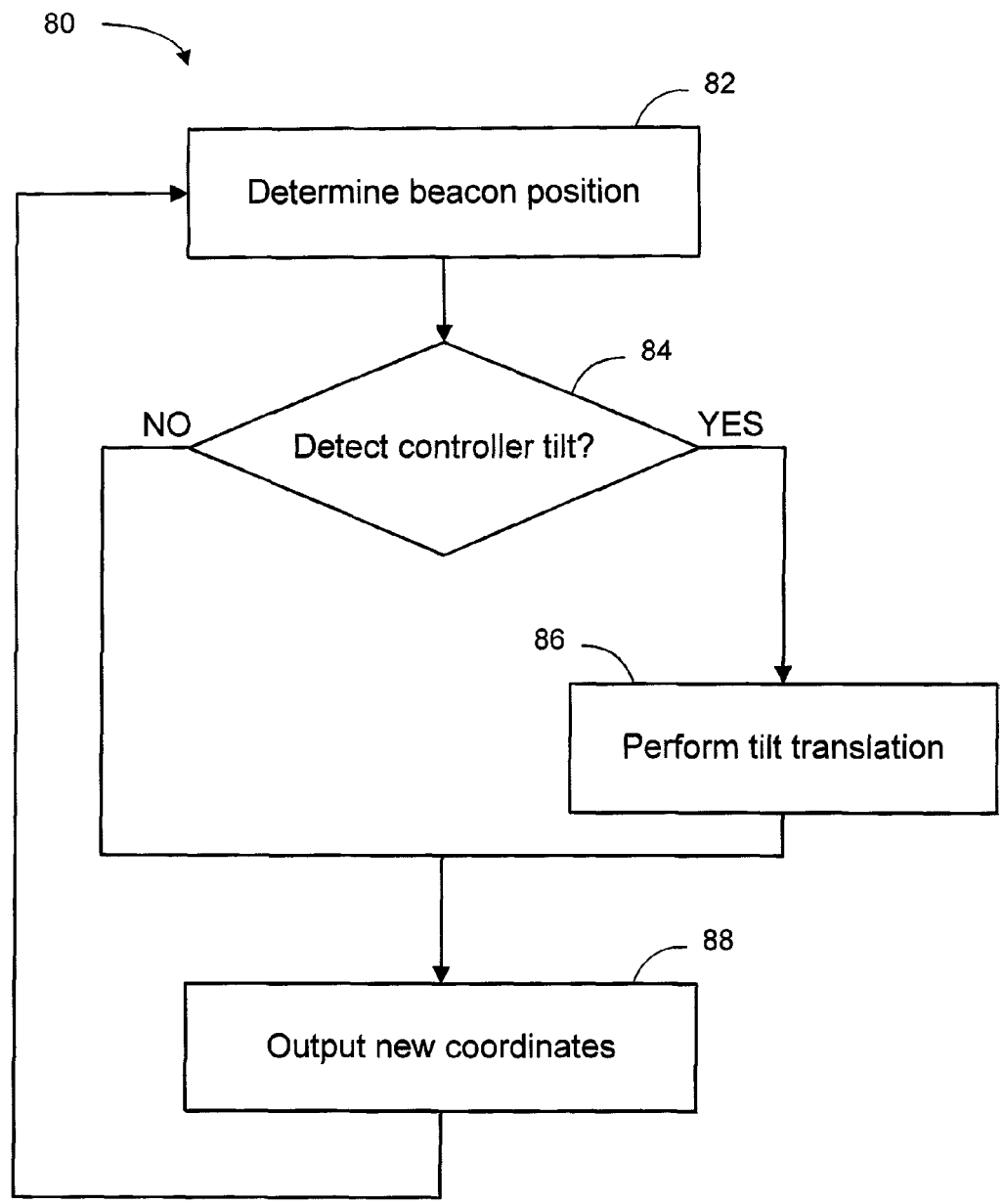
FIG. 8 depicts a schematic diagram of one embodiment of a method for compensating for movement of a controller which is not aligned with the axes of the beacon navigation system.

FIG. 8 depicts a schematic diagram of one embodiment of a method 80 for compensating for movement of a controller 42 which is not aligned with the x, y, and z axes 18, 20, and 22 of the beacon navigation system 40. Although references are made to the navigation system 40 of FIG. 4, embodiments of the method 80 may be implemented in conjunction with other navigation systems.

At block 82, the controller 42 determines the position of the beacon 44. In one embodiment, the beacon position may be calculated directly from a captured image. Alternatively, the beacon position may be derived from the position of the controller 42, which is also calculated from the captured image. Either the controller 42, or the console 48, or both, may calculate the position of the beacon 44. At block 84, the digital processor 52 then uses the determined beacon position to determine if the controller 42 is misaligned, or tilted, with respect to one or more axes 18, 20, and 22 of the coordinate system of the navigation system 40. If the controller 42 is misaligned, or tilted, then at block 86 the digital processor 52 performs tilt translation according to a compensation algorithm such as the equations described above. At block 88, the digital processor 52 then outputs the new coordinates (or other position data). For example, the controller 42 may transmit the position data to the console 48. However, if the controller 42 is not misaligned, or tilted, then the digital processor 52 does not perform any compensation. The digital processor 52 simply outputs the calculated position data. This process continues during the operation of the controller 42.

Figure 9:
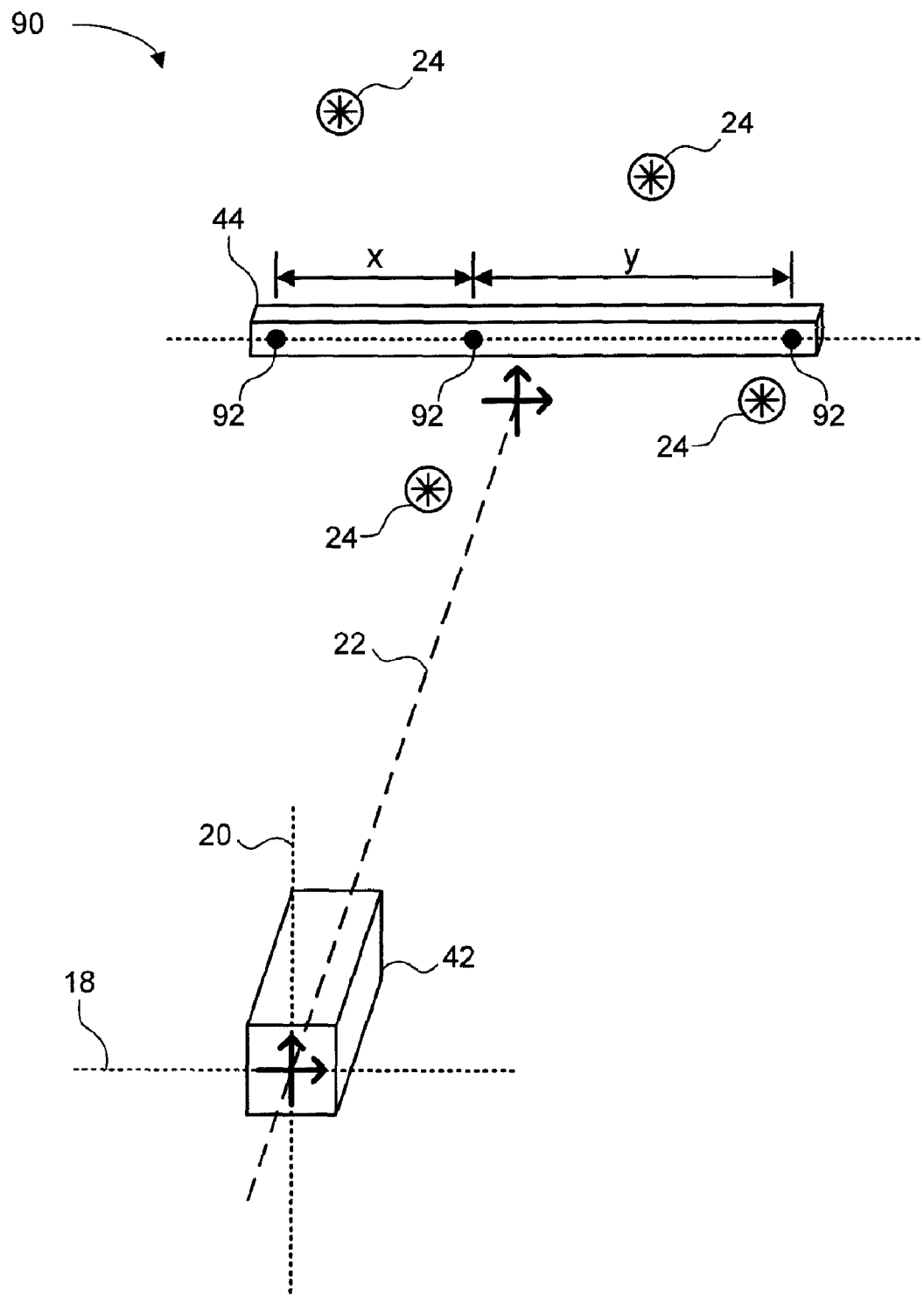
FIG. 9 depicts a schematic diagram of one embodiment of a beacon navigation system including a beacon with more than two beacon light sources to distinguish environmental noise.

FIG. 9 depicts a schematic diagram of one embodiment of a beacon navigation system 90 including a beacon 44 with more than two beacon light sources 92 to distinguish environmental noise. While some embodiments of the beacon navigation system 90 may be used in the beacon navigation system 40 shown in FIG. 4, other embodiments of the beacon navigation system 90 may be used independently of the beacon navigation system 40 of FIG. 4. In particular, the beacon navigation system 90 may be implemented in a system which operates only in a beacon navigation mode, but does not operate in other navigation modes. Alternatively, the beacon navigation system 90 may be implemented with other navigation systems, including a navigation system which combines beacon navigation and gyro navigation.

The illustrated beacon 44 includes multiple beacon light sources 92 which are spaced at known distances from one another. Although three beacon light sources 92 are shown in FIG. 9, other embodiments of the beacon 44 may include more than three beacon light sources 92. Additionally, some embodiments may implement a non-linear configuration of the beacon light sources 92, although non-linear beacon configurations may be more processing intensive. Additionally, non-linear beacon configuration may be designed so that the ground (i.e., horizon) reference can be extracts. For example, embodiments of isosceles and scalene triangle configuration may be implemented. Alternatively, other embodiments may be implemented.

For convenience in describing the beacon 44, the left and center beacon light sources 92 may be designated as a first pair of beacon light sources, and the center and right beacon light sources 92 may be designated as a second pair of beacon light sources. In the depicted embodiment, the distance, x, between the first pair of beacon light sources is less than the distance, y, between the second pair of light sources. Thus, the ratio of distances can be expressed as x:y. Since the individual distances, x and y, are known, the distance ratio, x:y, is also known. When the controller 42 images the beacon 44, the digital processor 52 may identify the beacon light sources 92 by identifying the imaged light sources which are positioned in the same distance ratio. Additionally, the digital processor 52 may determine if the identified light sources are aligned in the correct configuration (e.g., a straight line). Since the controller 42 can identify the beacon light sources 92 in this manner, the digital processor 52 may disregard the remaining light sources in the image as environment noise.

It should be noted that, in some embodiments, the particular distance ratio of beacon 44 is maintained regardless of the angle of the controller 42 with respect to the beacon 44. Similarly, the distance ratio of the beacon is maintained regardless of the tilt, or misalignment, of the controller 42 with respect to the beacon. Additionally, the beacon 44 could be used to detect the angle of the controller 42. For example, the beacon 44 could be used to detect if the controller 42 is turned 180 degrees from a calibrated position.

Figure 10:
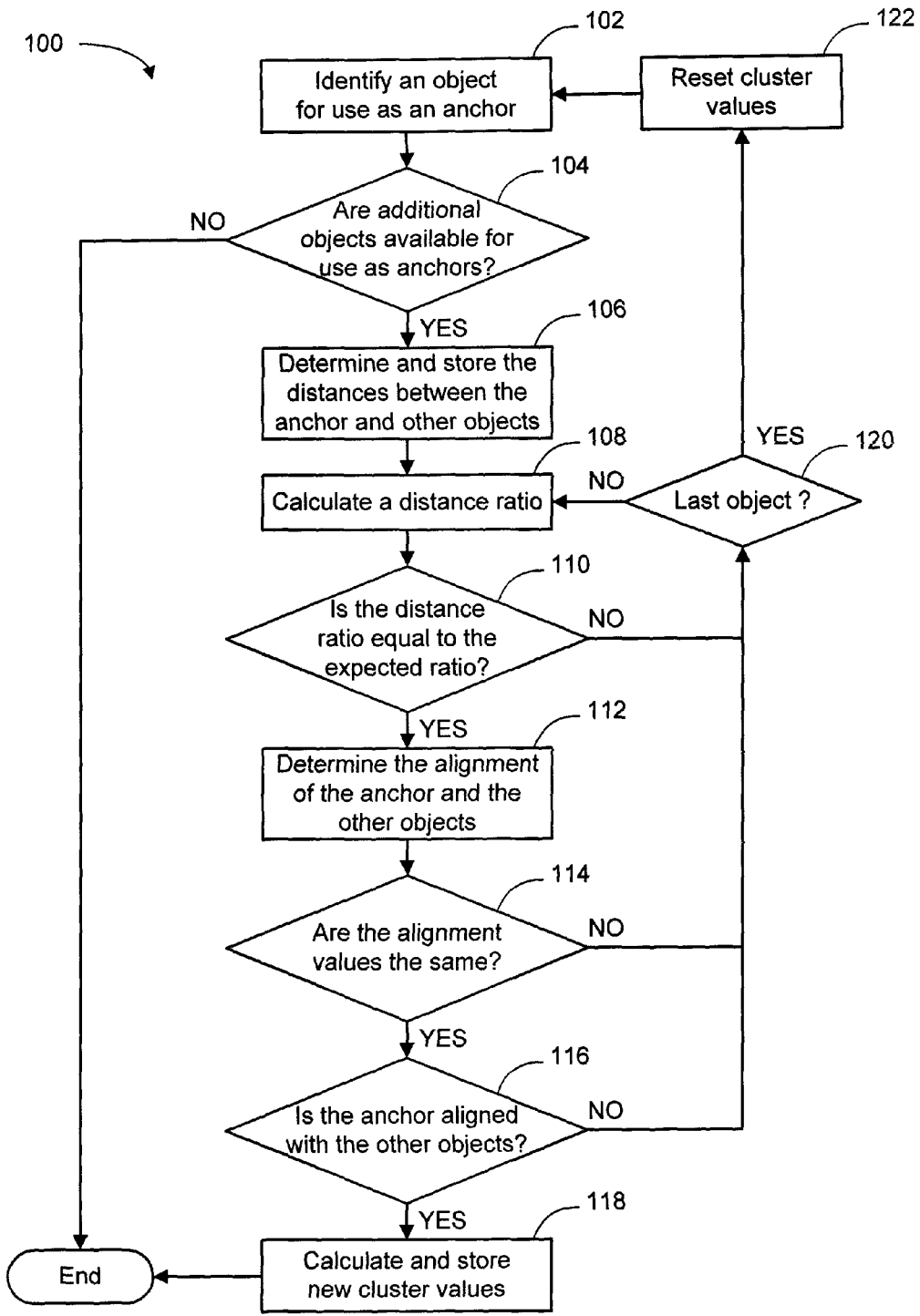
FIG. 10 depicts a schematic diagram of one embodiment of a method to distinguish environmental noise imaged by an image sensor in a beacon navigation system.

FIG. 10 depicts a schematic diagram of one embodiment of a method 100 to distinguish environmental noise imaged by an image sensor 60 in a beacon navigation system 90. Although reference is made to the navigation system 90 of FIG. 9, embodiments of the method 100 may be implemented in conjunction with other navigation systems, as described above.

At block 102, the digital processor 52 identifies an object within the image for use as an anchor. As an example, in the process of searching for the beacon light sources 92, each object may be sequentially used as an anchor. Each selected anchor is used, along with other objects in the image, to calculate possibly distance ratios. If a calculated distance ratio matches the predefined ratio, then the selected anchor and the corresponding objects will be designated as the beacon light sources 92. In one embodiment, the identified object is any potential light source within the image. At block 104, the digital processor 52 then determines if there are additional objects available for use as anchors. If the digital processor 52 determines that there are no additional objects available for use as anchors, then the process ends because there are not enough objects to potentially identify at least three light sources. Alternatively, if the digital processor 52 determines that there are additional objects available for use as anchors, then the process continues.

At block 106, the digital processor 52 determines and stores the distances between the anchor and the other objects.

In one embodiment, these distances are stored in the memory device 54. At block 108, the digital processor 52 calculates at least one distance ratio. At block 110, the digital processor 52 determines if the calculated distance ratio is equal to the expected distance ratio. In some embodiments, the calculated distance ratio can be within a specified tolerance of the expected distance ratio.

If the calculated distance ratio is equal to the expected distance ratio, then at block 112 the digital processor 52 determines the alignment of the anchor and the other objects. At block 114, the digital processor 52 determines if the alignment values are the same. For example, if a straight line, or linear, beacon 44 is used, the arrangement of the anchor and the other object should form a straight line. When controller 42 is tilted, the anchor and objects that are seen by the image sensor 60 will still form a straight line. Hence the alignment value for the observed beacon light source 92 in this case is a straight line. All objects that do not fall within this alignment value will be disregard. Hence, all external light sources 24 are filtered. However, if a beacon of a different design (e.g., non-linear linear configuration) is used, as described above, then the alignment values will be adapted to that particular shape or setup. If the alignment values are the same, then at block 116 the digital processor 52 determines if the anchor is aligned with the other objects. If the anchor is aligned with the other objects, then at block 118 the digital processor 52 calculates and stores the new cluster values, which are position data related to the relative position of the beacon 44 and the controller 42.

However, there are several points at which the depicted method 100 may branch to another operation. For example, if the calculated distance ratio is not equal to the expected distance ratio, then at block 120 the digital processor 52 determines if there are other objects that can be used. In other words, the discarded object may be designated as environmental noise since it does not appear to be one of the beacon light sources 92. Similarly, if the alignment values are not the same, or if the anchor is not aligned with the other objects, then the digital processor 52 may discard one or more identified objects.

At block 120, if the digital processor 52 determines that there are additional objects, then at block 108 the digital processor 52 calculates a new distance ratio using the same anchor and other objects. Alternatively, if there are no additional objects, then the digital processor 122 may reset the cluster values and reinitiate the process from the beginning using a different object as the anchor.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A controller for navigation in a navigation system, the controller comprising:
an image sensor configured to generate an image within a field of view of the controller; and
a processor coupled to the image sensor, the processor configured to process the image to alternatively implement beacon-based navigation and scene-based navigation depending on the processed image,
wherein the processor is further configured to determine if the processed image includes a representation of a beacon, to implement the beacon-based navigation in response to a determination that the processed image includes the representation of the beacon and to implement the scene-based navigation in response to a determination that the processed image excludes the representation of the beacon.

2. A non-transitory computer readable medium comprising machine readable instructions which, when executed by a digital processor of a navigation system, cause the digital processor to perform operations comprising:
receive a plurality of images within a field of view of an image sensor;
determine whether at least one of the plurality of images includes a representation of a beacon;
generate a first position data signal according to beacon-based navigation in association with an image in response to a determination that the image includes the representation of the beacon; and
generate a second position data signal according to scene-based navigation in association with another image in response to a determination that the another image excludes the representation of the beacon.

3. The computer readable medium of claim 2 wherein the machine readable instructions, when processed by the digital processor, cause the digital processor to perform additional operations comprising:
transmit the first and second position data signals from a controller to a console coupled to a display device.

4. The computer readable medium of claim 3 wherein the machine readable instructions, when processed by the digital processor, cause the digital processor to perform additional operations comprising:
compare at least portions of consecutive images of the plurality of images; and
determine a position of the controller based on relative positioning of the compared portions of the consecutive images.

5. The controller of claim 1, wherein the processor is further configured to compare at least a portion of the processed image to at least a portion of a previous image in order to generate position data associated with a position of the controller.

6. The controller of claim 1 further comprising:
a transmitter coupled to the digital processor, the transmitter configured to transmit a position data signal associated with the image to a console coupled to a display device.

7. The controller of claim 1 wherein the processor is further configured to determine, from the processed image, an alignment of the controller relative to a coordinate system of the navigation system.

8. The controller of claim 7 wherein the processor is further configure to generate position data for the controller to compensate for a misalignment of the controller relative to the coordinate system of the navigation system.

9. The controller of claim 1 wherein the processor is further configured and determine, from the processed image, a ratio of a first beacon distance to a second beacon distance, wherein the first beacon distance comprises a first calculated distance between a first pair of beacon light sources, and the second beacon distance comprises a second calculated distance between a second pair of beacon light sources, wherein the first and second pairs of beacon light sources comprises at least three unique beacon light sources.

10. The controller of claim 9 wherein the processor is further configured to distinguish between the beacon light sources and a non-beacon light source.

11. A method for controlling a navigation system, the method comprising:
generating a plurality of images within a field of view of an image sensor using the image sensor;
determining whether at least one of the plurality of images includes a representation of a beacon;
generating a first position data signal according to beacon-based navigation in association with an image in response to a determination that the image includes the representation of the beacon; and
generating a second position data signal according to scene-based navigation in association with another image in response to a determination that the another image excludes the representation of the beacon
wherein at least one of the determining, the generating the first position data signal and the generating the second position data is performed by a navigation processing logic in one of an integrated circuit and a processor of the navigation system.

12. The method of claim 11 further comprising transmitting the first and second position data signals from a controller to a console coupled to a display device.

13. The method of claim 12 further comprising:
comparing at least portions of consecutive images of the plurality of images; and
determining a position of the controller based on relative positioning of the compared portions of the consecutive images.

14. The method of claim 11 further comprising:
determining, from at least one of the plurality of images, an alignment of a controller relative to a coordinate system of the navigation system; and
generating position data for the controller, wherein the position data compensates for a misalignment of the controller relative to the coordinate system of the navigation system.

15. The method of claim 11 further comprising:
determining a ratio of a first beacon distance to a second beacon distance, wherein the first beacon distance comprises a first calculated distance between a first pair of beacon light sources and, and the second beacon distance comprises a second calculated distance between a second pair of beacon light sources; and
distinguishing between the beacon light sources a non-beacon light source.

16. The computer readable medium of claim 2 wherein the machine readable instructions, when processed by the digital processor, cause the digital processor to perform additional operations comprising:
determine, from at least one of the plurality of images, an alignment of a controller relative to a coordinate system of the navigation system; and
generate position data for the controller, wherein the position data compensates for a misalignment of the controller relative to the coordinate system of the navigation system.

17. The computer readable medium of claim 2 wherein the machine readable instructions, when processed by the digital processor, cause the digital processor to perform additional operations comprising:
determine a ratio of a first beacon distance to a second beacon distance, wherein the first beacon distance comprises a first calculated distance between a first pair of beacon light sources and, and the second beacon distance comprises a second calculated distance between a second pair of beacon light sources; and distinguish between the beacon light sources and a non-beacon light source.

* * * * *